United States Patent
Nishi et al.

(10) Patent No.: US 10,071,480 B2
(45) Date of Patent: Sep. 11, 2018

(54) REAL-TIME INTERFERENCE CHECK SYSTEM OF MACHINE TOOL AND ROBOT

(71) Applicant: FANUC CORPORATION, Yamanashi (JP)

(72) Inventors: Hiroji Nishi, Yamanashi (JP); Masahiro Oyamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 21 days.

(21) Appl. No.: 15/212,568

(22) Filed: Jul. 18, 2016

(65) Prior Publication Data

US 2017/0028558 A1 Feb. 2, 2017

(30) Foreign Application Priority Data

Jul. 27, 2015 (JP) .................. 2015-147739

(51) Int. Cl.
*B25J 9/16* (2006.01)

(52) U.S. Cl.
CPC ............ *B25J 9/1666* (2013.01); *B25J 9/1671* (2013.01); *B25J 9/1692* (2013.01); *G05B 2219/40476* (2013.01); *Y02P 90/087* (2015.11)

(58) Field of Classification Search
CPC ...... B25J 9/1666; B25J 9/1674; B25J 9/1692; G05B 2219/40476; Y02P 90/02
See application file for complete search history.

(56) References Cited

U.S. PATENT DOCUMENTS

| 2007/0150093 A1* | 6/2007 | Nagatsuka ............ B25J 9/1682 700/235 |
| 2011/0196533 A1* | 8/2011 | Scheurer ............... B25J 9/1666 700/255 |
| 2011/0306374 A1 | 12/2011 | Hirai |
| 2012/0057479 A1 | 3/2012 | Maruyama et al. |
| 2013/0311154 A1* | 11/2013 | Atohira .................... G06T 1/00 703/6 |

(Continued)

FOREIGN PATENT DOCUMENTS

| JP | 06-28019 A | 2/1994 |
| JP | H07-050407 B2 | 5/1995 |

(Continued)

*Primary Examiner* — Khoi H Tran
*Assistant Examiner* — Robert T Nguyen
(74) *Attorney, Agent, or Firm* — Hauptman Ham, LLP (57) ABSTRACT

An interference check system capable of appropriately checking interference between a machine tool and a robot in real time even in the case where real-time properties of data communication are not secured in a system including a machine tool and a robot. The interference check system includes a machine tool controller configured to control a machine tool, a robot controller configured to control a robot, and an interference check execution unit configured to include shape model data or the like of a machine tool mechanical unit and a robot mechanical unit. The interference check execution unit checks presence/absence of interference between the machine tool mechanical unit and the robot mechanical unit based on the shape model data of the machine tool and the robot and time-series data generated by integrating the positions of the control axes of the machine tool and the robot, respectively.

4 Claims, 10 Drawing Sheets

(56) References Cited

U.S. PATENT DOCUMENTS

| | | | | |
|---|---|---|---|---|
| 2015/0032257 A1* | 1/2015 | Hashiguchi | ................ | B25J 9/06 |
| | | | | 700/248 |
| 2015/0190204 A1* | 7/2015 | Popovi | ................... | A61B 34/20 |
| | | | | 600/424 |
| 2015/0336269 A1* | 11/2015 | Linnell | .................. | B25J 9/1656 |
| | | | | 700/245 |
| 2016/0283792 A1* | 9/2016 | Okazaki | ............. | G06K 9/00664 |
| 2017/0097631 A1* | 4/2017 | Linnell | .................. | B25J 9/1656 |

FOREIGN PATENT DOCUMENTS

| | | | |
|---|---|---|---|
| JP | 10-133708 | A | 5/1998 |
| JP | 11-207669 | A | 8/1999 |
| JP | 2002-287816 | A | 10/2002 |
| JP | 2005-161498 | A | 6/2005 |
| JP | 2006-000977 | A | 1/2006 |
| JP | 2006-68857 | A | 3/2006 |
| JP | 2008-71015 | A | 3/2008 |
| JP | 2009-020547 | A | 1/2009 |
| JP | 2010-94794 | A | 4/2010 |
| JP | 2010-218036 | A | 9/2010 |
| JP | 2012-060207 | A | 3/2012 |
| JP | 2012-216151 | A | 11/2012 |
| JP | 2012-223845 | A | 11/2012 |
| JP | 2015-225419 | A | 12/2015 |
| WO | 2010095713 | A1 | 8/2010 |

* cited by examiner

REAL-TIME INTERFERENCE CHECK SYSTEM OF MACHINE TOOL AND ROBOT

RELATED APPLICATIONS

The present application claims priority to Japanese Application Number 2015-147739, filed Jul. 27, 2015, the disclosure of which is hereby incorporated by reference herein in its entirety.

BACKGROUND OF THE INVENTION

1. Field of the Invention

The present invention relates to an interference check system that checks interference between a machine tool and a robot in real time.

2. Description of the Related Art

At present, a CAD/CAM system for creating a machining program of a machine tool is commonly used. For example, JP H07-050407 B has described the technique in which a CAD/CAM system and a machine tool are connected on-line, detection data of the position and speed of an object to be controlled based on a clock signal that is detected on the machine tool side is caused to be fed back to the CAD/CAM and comparison operation processing of the detection data and NC data is performed, and correction control is performed by a closed loop that corrects the NC data.

JP 2012-060207 A has described a communication/control system in which a communication controller and a plurality of controllers each having an actuator and operating an object to be controlled are connected via a network.

WO 2010/095713 A describes a wireless communication system and a wireless communication method for causing a plurality of devices to perform a collaborative work at fixed intervals.

JP 2009-020547 A describes a distributed motion control system in which a control instruction with no absolute time attached is transmitted from a controller by an asynchronous communication method and thus a plurality of motors is controlled in synchronization.

Further, JP 2010-218036 A describes an off-line programming device having a second communication module that is connected with a first communication module of an NC simulator via a communication circuit and performs communication of information with the first communication module, a robot simulator that performs a simulation of a robot based on the information, and a program generation device that generates a teaching program off-line by using the simulation results in the robot simulator.

In the case where a robot is controlled by using some simultaneous axes control function of CNC of a machine tool, such as the FANUC Multi-path Control for the paths of the turning or the milling and the paths of a loader control path, it is possible to check interference in real time between the robot and the machine tool by using the CAD/CAM system as described in JP H07-050407 B. However, conventionally, in the case where the robot is not controlled directly by the CNC of the machine tool, the interlock between the robot and the machine tool by an I/O signal so that interference is prevented from occurring when the machine tool and the robot are caused to perform a collaborative work. It is known that a robot has a processing unit, inside the controller, configured to perform a real-time interference check, and there is a function that immediately takes steps in the case where the robot and another object are going to interfere with each other.

Except for the case where a robot is controlled by using the simultaneous axes control function of the CNC of the machine tool, there is such a problem that the machine tool and the robot are caused to perform a collaborative work because the real time interference check CAD/CAM system connected the CNC cannot check interference with the robot and the machine tool.

Even though both a machine tool and a robot have some physical connection interface ports suitable to communication with the real-time interference check CAD/CAM system, there is a case where the number of connection ports is actually insufficient when an attempt is made to connect the real-time interference check CAD/CAM system to one device and to further connect it to another device. Even if there is a communication connection port available at both the machine tool and the robot, there is a case where the specifications lack the real-time communication properties. In this case, the real-time interference check CAD/CAM system needs to combine the data, that is transmitted from one device, with the other data, that is transmitted from the other device. Furthermore the real-time interference check CAD/CAM system must correct the other data, that is transmitted from the other device, with respect to time. But there is such a problem that means the CAD/CAM system has no function of the correction are not available.

Further, even in the case where the robot itself has the real-time interference check function, there is such a problem that means for taking in the control-path of the mechanical unit of the machine tool in real time on the robot coordinate system and for checking interference between the mechanical unit and the robot and between the mechanical unit and the peripheral are not available.

None of the inventions described in the above-described patent documents will solve the above-described problems. For example, the invention described in JP 2012-060207 A is recognized as one relating to a motion control communication system for controlling a plurality of mechanical units (controllers) by one communication controller, but this invention premises that the real-time properties of the communication between the communication controller and each controller are secured, and therefore, in the case where the real-time properties are not secured, it is recognized that appropriate measures cannot be taken.

WO 2010/095713 A describes a technique for implementing motion control of slave stations, such as a robot and a servomotor, from a master station by wireless communication, but has not referred to the case where different kinds of communication protocols exist in the communication system.

JP 2009-020547 A has described that it is possible to synchronously control a group of servomotors by mounting a non-real-time OS and by using a general-purpose personal computer including the IEEE1394 interface. However, the object of the invention described in JP 2009-020547 A is the motion control, which is different from the interference check of the present invention.

Further, JP 2010-218036 A has described that information for checking interference is displayed on a monitor, but an operator actually checks interference, and there is not description of checking interference in real time by some automated system.

SUMMARY OF THE INVENTION

Consequently, an object of the present invention is to provide an interference check system capable of appropriately checking interference between a machine tool and a robot in real time even in the case where real-time properties of data communication are not secured in a system including a machine tool and a robot.

In order to attain the above-described object, the present invention provides an interference check system including a machine tool controller configured to control a machine tool, a robot controller configured to control a robot, and an interference check execution unit configured to include shape model data of a mechanical unit of the machine tool and a mechanical unit of the robot and at the same time, to check interference between the mechanical unit of the machine tool and the mechanical unit of the robot, and the machine tool controller or the robot controller integrates, during the operation of the robot and the machine tool, a set of an operation time of the robot and positions of control axes of the robot corresponding to the operation time of the robot, which set is generated by the robot controller, and a set of an operation time of the machine tool and positions of control axes of the machine tool corresponding to the operation time of the machine tool, which set is generated sequentially by the machine tool controller, and sequentially generates a set of a time and positions of control axes of the robot and the machine tool corresponding to the period while interference is checked, and the interference check execution unit checks interference in real time between the mechanical unit of the machine tool and the mechanical unit of the robot based on the shape models of the mechanical units of the machine tool and the robot and the period while interference is checked and the positions of the control axes of the robot and the machine tool corresponding to the period while interference is checked, which set is generated sequentially.

In an embodiment, the time when interference is checked is the same as the operation time of the machine tool. In another embodiment, the time when interference is checked is the same as the operation time of the robot.

The interference check execution unit may be a CAD/CAM system, or may be included in the machine tool controller, or may be included in the robot controller.

BRIEF DESCRIPTION OF THE DRAWINGS

The above-described or other objects, features, and advantages of the present invention will be clearer in light of the explanation of the following preferred embodiments with reference to the drawings.

DETAILED DESCRIPTION

Figure 1:
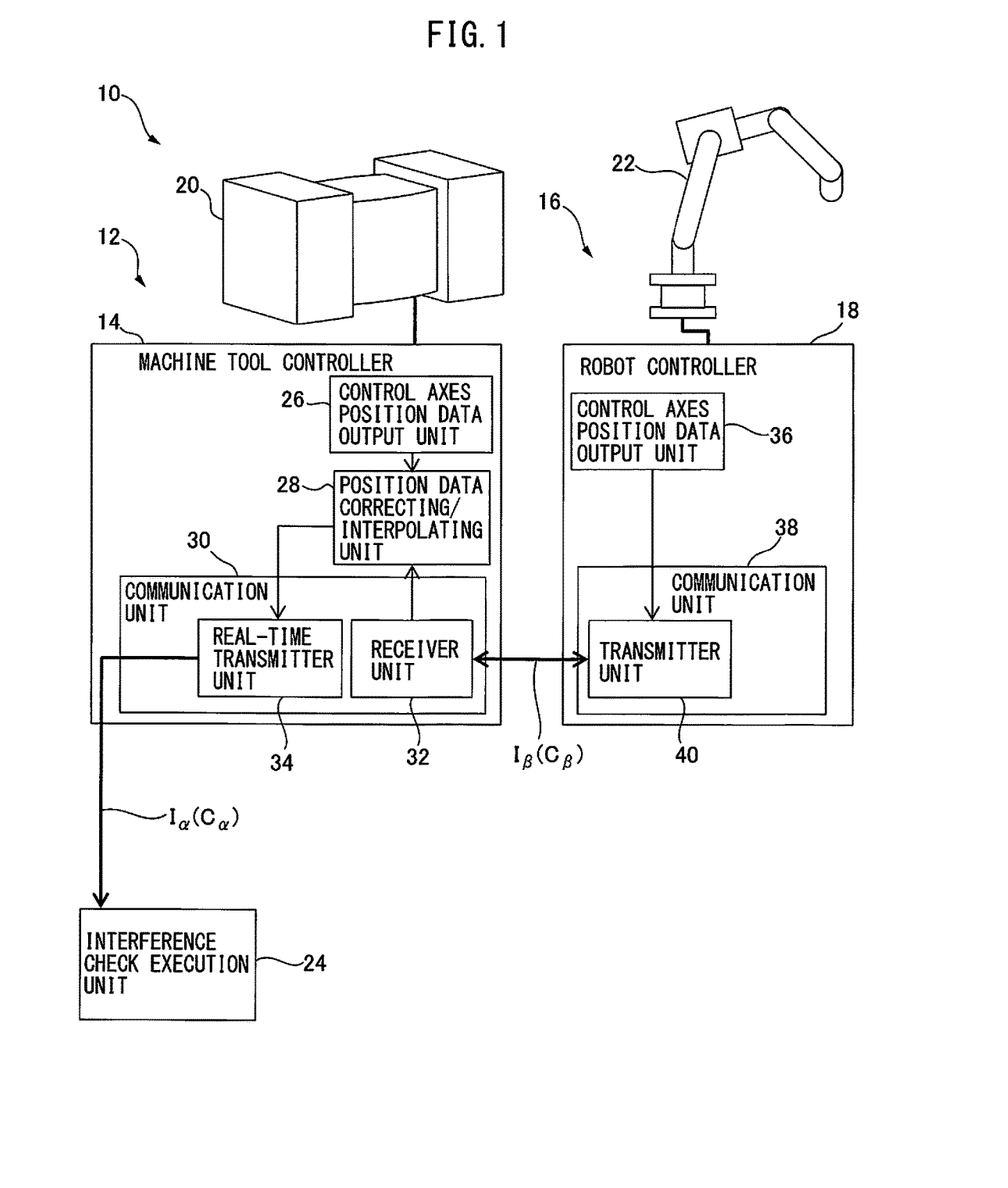
FIG. 1 is a diagram illustrating an outline configuration of an interference check system according to a first embodiment of the present invention.

FIG. 1 is a diagram illustrating an outline configuration of an interference check system 10 according to a first embodiment of the present invention. The interference check system 10 includes a machine tool controller 14 configured to control a machine tool 12, a robot controller 18 configured to control a robot 16, and an interference check execution unit 24 configured to include shape model data of a mechanical unit 20 of the machine tool 12 and a mechanical unit 22 of the robot 16, and layout information thereon. The machine tool 12 and the robot 16 are configured to perform a collaborative work in such a manner that, for example, the machine tool 12 machines a workpiece loaded by the robot 16, the robot 16 unloads the machined workpiece from the machine tool 12, and so on. The interference check execution unit 24 is configured to check interference between the mechanical unit 20 of the machine tool and the mechanical unit 22 of the robot, and may be, for example, a real-time CAD/CAM system, or may be included in the machine tool controller 14.

The machine tool controller 14 has a control axis position data output unit 26 configured to output position data of the control axis of the machine tool 12 at predetermined intervals, a position data correcting/interpolating unit 28 configured to correct/interpolate position data that is output from the position data output unit 26, and a communication unit 30 configured to perform data communication with the robot controller 18 and the interference check execution unit 24, and specifically, the communication unit 30 has a receiver unit 32 configured to receive position data from the robot controller 18 and a real-time transmitter unit 34 configured to transmit the position data from the position data correcting/interpolating unit 28 to the interference check execution unit 24 in real time.

On the other hand, the robot controller 18 has a control axis position data output unit 36 configured to output position data of the control axes of the robot 16 at predetermined intervals and a communication unit 38 configured to perform data communication with the machine tool controller 14, and specifically, the communication unit 38 has a transmitter unit 40 configured to transmit position data from the position data output unit 36 to the receiver unit 32 of the machine tool controller 14.

The real-time transmitter unit 34 of the machine tool controller 14 and the interference check execution unit 24 are connected via a wireless or wired interface $I_\alpha$, and via the interface $I_\alpha$, the position data (time-series data) of the control axes of the machine tool is cyclically transmitted to the interference check execution unit 24. It is assumed that the communication protocol in the interface $I_\alpha$ is $C_\alpha$, and the real-time properties of the data transmitting/receiving via the interface $I_\alpha$ are secured.

The interference check execution unit 24 performs processing to check presence/absence of interference between the mechanical unit 20 of the machine tool and the mechanical unit 22 of the robot within one period or several periods of the cyclic transmission based on the time-series data of position transmitted from the machine tool controller 14, and in the case where there is interference, it is possible for the interference check execution unit 24 to transmit operation stopping instructions or the like to the machine tool controller 14 by message transmission.

On the other hand, the receiver unit 32 of the machine tool controller 14 and the transmitter unit 40 of the robot controller 18 are connected via a wireless or wired interface $I_\beta$ and via the interface $I_\beta$, the position data of the control axis of the robot 16 is cyclically transmitted to the receiver unit 32 of the machine tool controller 14. The communication protocol in the interface $I_\beta$ is taken to be $C_\beta$, but the real-time properties may not be secured for the data transmitting/receiving via the interface $I_\beta$, and it is assumed that there may be a variation among the transmission intervals of the cyclic transmission.

In the specification of the present application, the "real-time properties (of communication)" mean that certain data reaches the receiver within a certain period of time without fail, and therefore, in the case where the "real-time properties are provided (real-time properties are secured)", it is possible for the device of the receiver to immediately perform an appropriate reaction by securely receiving data at short intervals. The "cyclic transmission" means communication having the real-time properties of communication by periodically transmitting/receiving a specific kind of data at short intervals. On the other hand, the "message transmission" means communication to transmit/receive data asynchronously, not periodically.

Next, with reference to FIG. 2 to FIG. 6, the processing in the interference check system 10 is explained. The flowchart in FIG. 2 mainly illustrates the processing in the machine tool controller 14 and the flowchart in FIG. 3 mainly illustrates the processing in the interference check execution unit 24.

First, when the production operation (cooperation work) by the machine tool 12 and the robot 16 is started (step S1 in FIG. 2), the interference check execution unit 24 performs real-time interference check processing of the mechanical unit 20 of the machine tool and the mechanical unit 22 of the robot (step S2). This processing will be described later.

Figure 2:
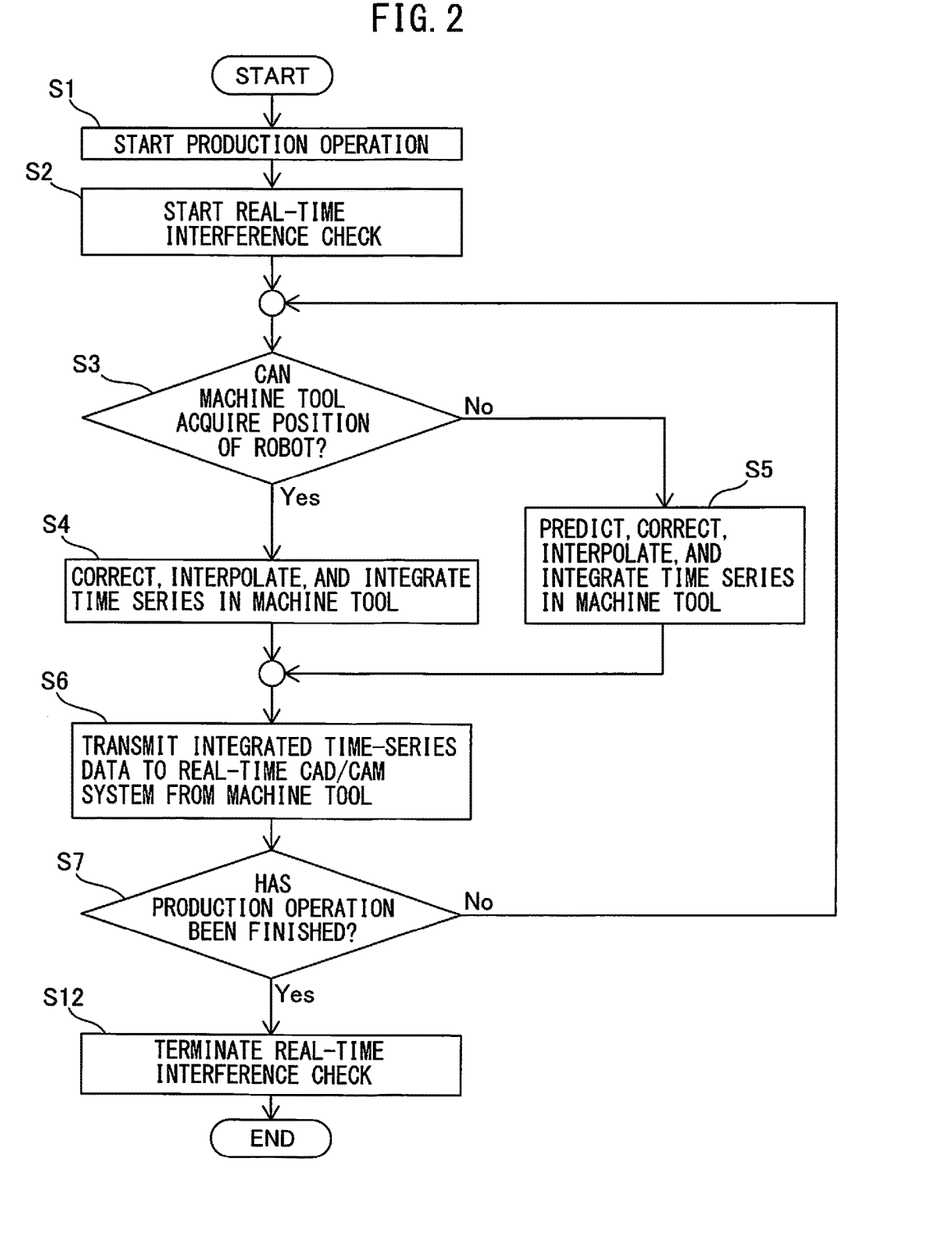
FIG. 2 is a flowchart mainly illustrating a flow of processing of a machine tool controller in the first embodiment.
Figure 4:
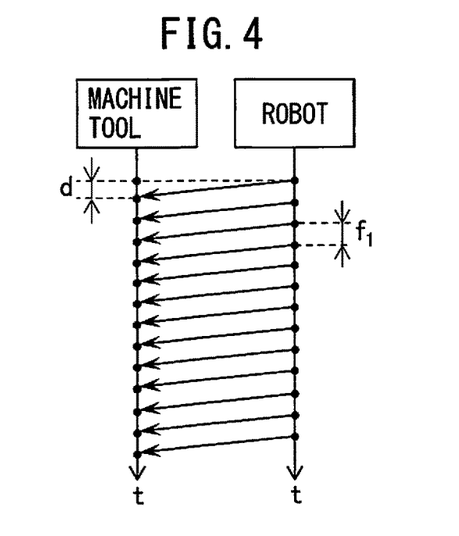
FIG. 4 is a diagram explaining a state where real-time properties of data communication from a robot to a machine tool are secured.

At the next step S3, whether or not the machine tool controller 14 can acquire, while having the real-time properties, a set (data set) of an operation time of the robot 16 (robot time) and a position of a control axis of the robot 16 corresponding to the robot time, which set is generated sequentially by the robot controller 18, is determined. More specifically, whether or not the real-time properties of the data communication from the transmitter unit 40 of the robot controller 18 to the receiver unit 32 of the machine tool controller 14 are secured is determined. FIG. 4 illustrates the case where the real-time properties of communication are secured, i.e., a transmission time delay d between the machine tool 12 and the robot 16 is sufficiently small compared to the time necessary for the calculation of correction/interpolation and communication intervals $f_1$ from the robot (controller) are comparatively short. In this case, the position data correcting/interpolating unit 28 of the machine tool controller 14 integrates the data set from the robot controller 18 and a set (data set) of an operation time of the machine tool 12 (machine tool time) and a position of a control axis of the machine tool 12 corresponding to the machine tool time, which set is generated sequentially by the machine tool controller 14. Specifically, the position data correcting/interpolating unit 28 performs interpolation with respect to time and newly obtains the position (time-series data) of the control axes of the robot 16 by performing correction calculation to obtain the position (time-series data) of the control axes of the machine tool 12 and the position of the control axes of the robot 16 corresponding to each machine tool time, and then couples both data sets (step S4).

Figure 5:
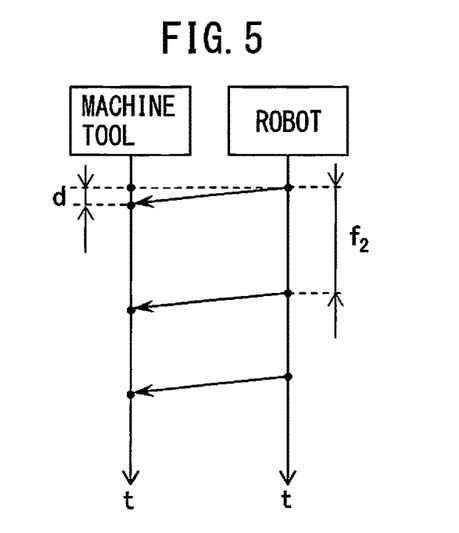
FIG. 5 is a diagram explaining a state where real-time properties of data communication from a robot to a machine tool are not secured.

On the other hand, FIG. 5 illustrates the case where the real-time properties of communication are not secured, i.e., the case where communication intervals $f_\alpha$ from the robot (controller) are comparatively long or the case where there is a variation thereamong. The case where the real-time properties of communication are not secured also includes the case where the transmission time delay d between the machine tool 12 and the robot 16 is too large to ignore compared to the time necessary for calculation of correction/interpolation. In this case, unlike the case in FIG. 4, the position data correcting/interpolating unit 28 needs to obtain the position of the control axes of the robot 16 corresponding to each machine tool time in the state where the positions (time-series) of the control axes of the robot 16 close to each machine tool time from the transmitter unit 40, for which interpolation is necessary, have not reached the receiver unit 32 yet. Because of this, processing to estimate (predict) the position of the control axes of the robot 16 corresponding to each machine tool time, which is necessary, by using the positions (time-series data) of the control axes of the robot 16 already accumulated in the past in the position data correcting/interpolating unit 28 is added (step S5).

As this estimation processing, mention is made of a method of obtaining a corrected position by performing extrapolation with respect to time with an appropriate linear function or smoothing function by using the positions (time-series data) of the control axis of the robot 16 accumulated in the past, and a method of performing estimation calculation using an Ensemble Kalman Filter by causing the position data correcting/interpolating unit 28 to hold a function to calculate an appropriate mathematical model of the robot 16 in advance before the production operation. Further, when the position data correcting/interpolating unit 28 is enabled to hold all the positions (time-series data) of the control axes in the past transmitted from the controller of the robot 16 after the production operation, there is a method of performing processing in parallel to try to search whether periodicity occurs in the change in position with the passage of the accumulated time-series and when it is possible to determine that the positions (time-series data) of the robot 16 repeated periodically, of applying optimum interpolation by extracting the repeated positions (time-series data).

By the processing at step S4 or S5, the position of the robot after the interpolation and the position of the machine tool are integrated into one piece of time-series data of position. This integrated (coupled) time-series data is transmitted from the machine tool controller 14 to the interference check execution unit 24 (e.g., real-time CAD/CAM system) (step S6). The processing at steps S3 to S6 is repeated until the production operation is finished (step S7).

Figure 3:
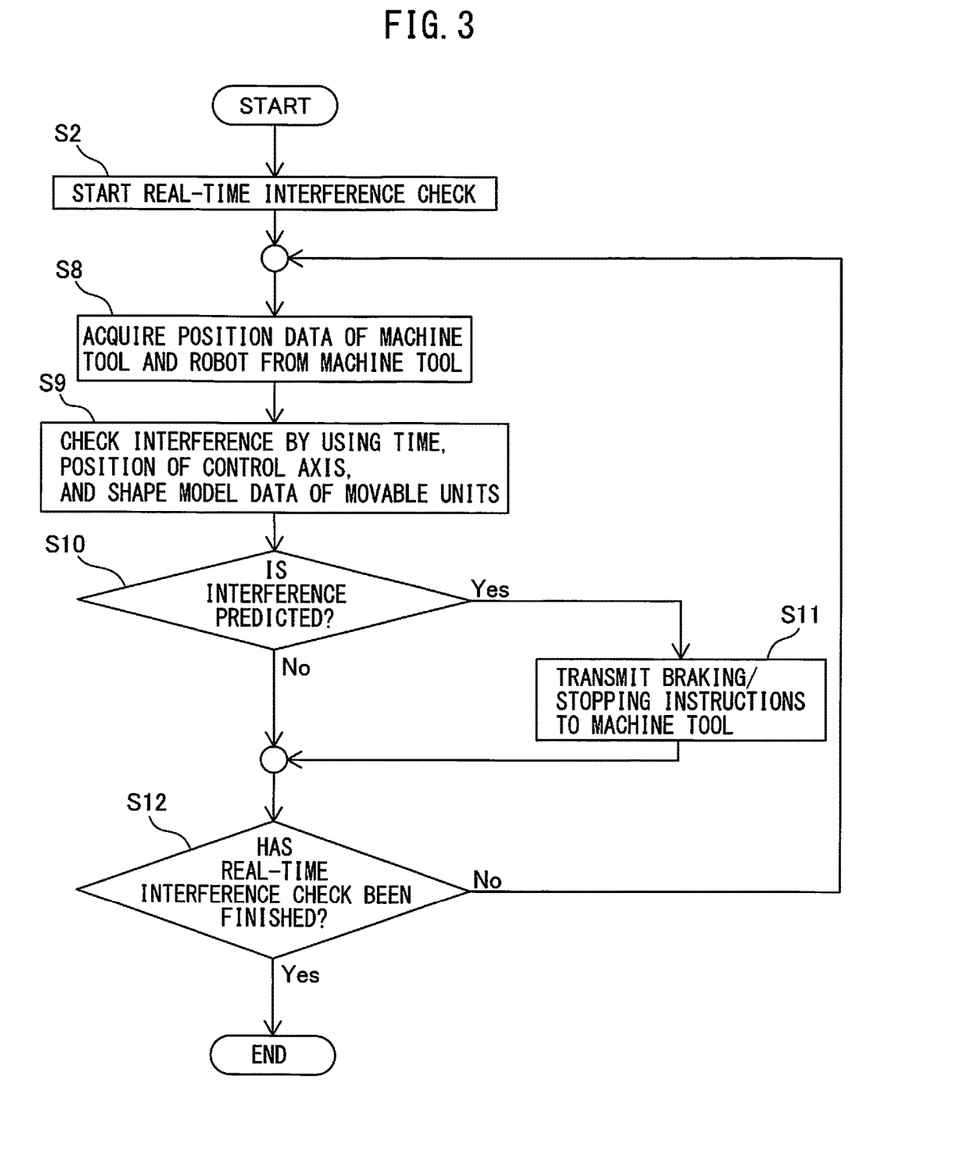
FIG. 3 is a flowchart mainly illustrating a flow of processing of an interference check execution unit in the first embodiment.

In relation to step S6 in FIG. 2, the interference check execution unit 24 receives the integrated (time-series) data of positions of the machine tool 12 and the robot 16 from the machine tool controller 14 (step S8 in FIG. 3). Next, the interference check execution unit 24 checks presence/absence of interference between the mechanical unit 20 of the machine tool and the mechanical unit 22 of the robot (specifically, presence/absence of contact or overlap between the two shape models) based on the shape models of the mechanical unit 20 of the machine tool and the mechanical unit 22 of the robot stored and held in advance and the integrated time-series data (specifically, each time included in the time-series data (time when interference is checked) and the positions of the control axes of the machine tool and the robot corresponding to each time) (step S9). In the first embodiment, the time when interference is checked is the same as the operation time of the machine tool 12.

In the case where it is predicted that interference will occur based on the results of the processing at step S9, braking/stopping instructions are transmitted to the machine tool controller 14 from the interference check execution unit 24 by message transmission (step S11). The real-time interference check at step S8 and subsequent steps is repeated until the production operation is finished (step S12, step S7 in FIG. 2).

It may also be possible to perform the interference check processing only during the production operation or while power is being supplied to the machine tool 12 and the robot 16 even if the production operation is not being performed. Alternatively, even if the production operation is not being performed, it may also be possible to perform the interference check in real time and to disable the operation of an operator when interference is predicted also in the case where the operator of the machine tool manually operates the spindle axis of the machine tool and movable units, such as the machining table, in the case of operating the machine tool by programs, in the case of jogging the robot, etc.

Figure 6:
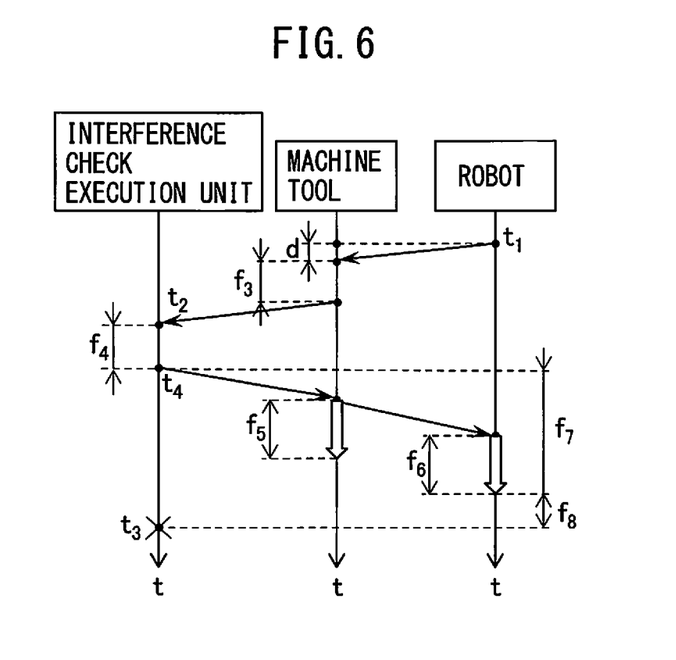
FIG. 6 is a diagram explaining an example of transmitting/receiving of time-series data among a robot, a machine tool, and an interference check execution unit in terms of a time chart.

FIG. 6 is a diagram explaining the flow of the processing explained by using the flowcharts in FIG. 2 and FIG. 3 in terms of a time chart. First, when the position data of the robot control axis corresponding to a time $t_1$ is sent to the machine tool after the transmission time delay d, the machine tool performs the processing at step S4 or S5 described above. Normally, this processing is performed at intervals $f_3$ of 1 ms (milliseconds) to 10 ms. Next, the integrated time-series data of positions is sent to the interference check execution unit 24 (time $t_2$) and the processing at step S8 described above is performed. Normally, this processing is performed at intervals $f_4$ of 0.25 ms to 40 ms.

Here, in the case where it is predicted that interference will occur at an interference-predicted time $t_3$ (step S9 in FIG. 3), the braking/stopping instructions are transmitted to the machine tool controller 14 from the interference check execution unit 24 by message transmission (step S10) and the machine tool 12 stops after a braking/stopping time $f_5$ elapses. Further, after receiving of the braking/stopping instructions, the machine tool controller 14 immediately transmits the braking/stopping instructions to the robot controller 18 by message transmission and the robot 16 stops after a braking/stopping time $f_6$ elapses.

As illustrated in FIG. 6, it is preferable to set the interference-predicted time $t_3$ to be the time after a minimum braking/stopping time $f_7$ of the collaboration system including the machine tool 12 and the robot 16 and a predetermined margin time $f_8$ elapse from a time (time when braking/stopping instructions are transmitted to the machine tool) $t_4$ when the interference check processing is completed. The minimum braking/stopping time $f_7$ of the system is the braking/stopping time of the machine tool 12 or the braking/stopping time of the robot 16, whichever is later from the time $t_4$.

Here a specific example of the interference check processing by the interference check execution unit 24 is explained. A first specific example is an example in which a film having an appropriate thickness is added to the shape model data of the mechanical unit 20 of the machine tool and the mechanical unit 22 of the robot, respectively, and if those films come into contact with each other (contact is predicted), the braking/stopping instructions are output. Preferably, the thickness of the film here is set as the maximum value of the distance traveled by the mechanical units of the machine tool and the robot, respectively, from the receiving the braking/stopping instructions until the mechanical units actually stop.

A second specific example is an example in which the positions of the mechanical unit 20 of the machine tool and the mechanical unit 22 of the robot, respectively, at a future time are estimated at all times based on the time-series data of position thereof and in the case where interference will occur (i.e., the two pieces of shape model data will come into contact with each other or overlap each other) in the positions at the future time, the braking/stopping instructions are output. Here, it is premised that the braking time of each of the machine tool and the robot is already known, and then the positions at a future time after the braking/stopping time elapses from the point in time of the completion of the interference check are estimated. This time is called an interference check-required future time. The interference check is performed for the positions data corresponding to the interference check-required future time.

In the case where there are positions time-series in future time to check the interference, and where the positions data of the time are the most distant future and the position is the interference check-required future time or a time more distant from the interference check-required future time, the positions are acquired by the interpolation. In the case where the interference check-required future time is beyond the time of acquired time-series from the controller, the position data correcting/interpolating unit 28 estimates the position of each mechanical unit corresponding to the interference check-required future time.

For the method of estimating the positions of each mechanical unit, there are the following two methods. The first method is an extrapolation by using an appropriate function, such as a linear function and a smoothing function. In the case where the production operation program is repeated, the positions time-series are recorded at all production times and the optimum interpolation method or the like to make an appropriate prediction by referring to the record is applied. But it is known whether the production operation program is repeated, it is possible to estimate position data by a prediction model, such as an Ensemble Kalman Filter.

The second method is a method of estimating position data by not only acquiring the positions time-series, also acquiring the production program progress, when all or some parts of the production operation program codes can be acquired, and performing a time-progressive simulation following the sequentially executions of the program codes, and comparing the acquired time-series data with the simulated data.

Figure 7:
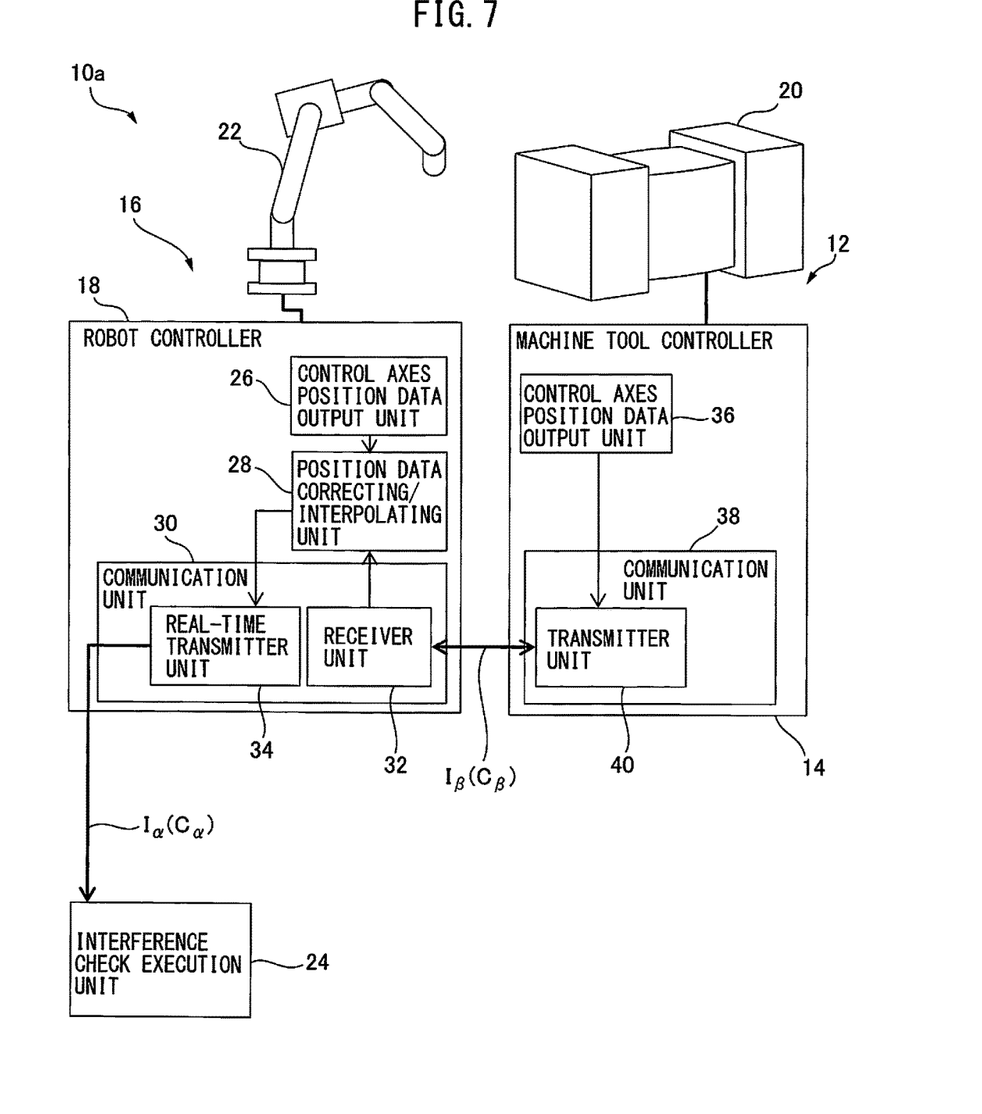
FIG. 7 is a diagram illustrating an outline configuration of an interference check system according to a second embodiment of the present invention.

FIG. 7 is a diagram illustrating an outline configuration of an interference check system 10$a$ according to a second embodiment of the present invention. The interference check system 10$a$ includes the machine tool controller 14 configured to control the machine tool 12, the robot controller 18 configured to control the robot 16, and the interference check execution unit 24 configured to include shape model data of the mechanical unit 20 of the machine tool 12 and the mechanical unit 22 of the robot 16, and layout information thereon. The machine tool 12 and the robot 16 are configured to perform a collaborative work in such a manner that, for example, the machine tool 12 machines a workpiece loaded by the robot 16, the robot 16 unloads the machined workpiece from the machine tool 12, and so on. The interference check execution unit 24 is configured to check interference between the mechanical unit 20 of the machine tool and the mechanical unit 22 of the robot, and may be, for example, a real-time CAD/CAM system, or may be included in the robot controller 18.

The robot controller 18 has the control axes position data output unit 26 configured to output position data of the control axis of the robot 16 at predetermined intervals, the position data correcting/interpolating unit 28 configured to correct/interpolate position data that is output from the position data output unit 26, and the communication unit 30 configured to perform data communication with the machine tool controller 14 and the interference check execution unit 24, and specifically, the communication unit 30 has the receiver unit 32 configured to receive position data from the machine tool controller 14 and the real-time transmitter unit 34 configured to transmit the position data from the position data correcting/interpolating unit 28 to the interference check execution unit 24 in real time.

On the other hand, the machine tool controller 14 has the control axes position data output unit 36 configured to output position data of the control axes of the machine tool 12 at predetermined intervals and the communication unit 38 configured to perform data communication with the robot controller 18, and specifically, the communication unit 38 has the transmitter unit 40 configured to transmit positions data from the position data output unit 36 to the receiver unit 32 of the robot controller 18

As is known from a comparison between FIG. 1 and FIG. 7, the interference check system 10a differs from the interference check system 10 according to the first embodiment in that the source of communication of the position data of the control axes is the machine tool controller 14 and the destination of communication is the robot controller 18 and the other components and the functions thereof may be the same as those of the first embodiment. Consequently, in FIG. 7, the same reference symbols are attached to the components equivalent to those of the first embodiment and detailed explanation thereof is omitted.

Figure 8:
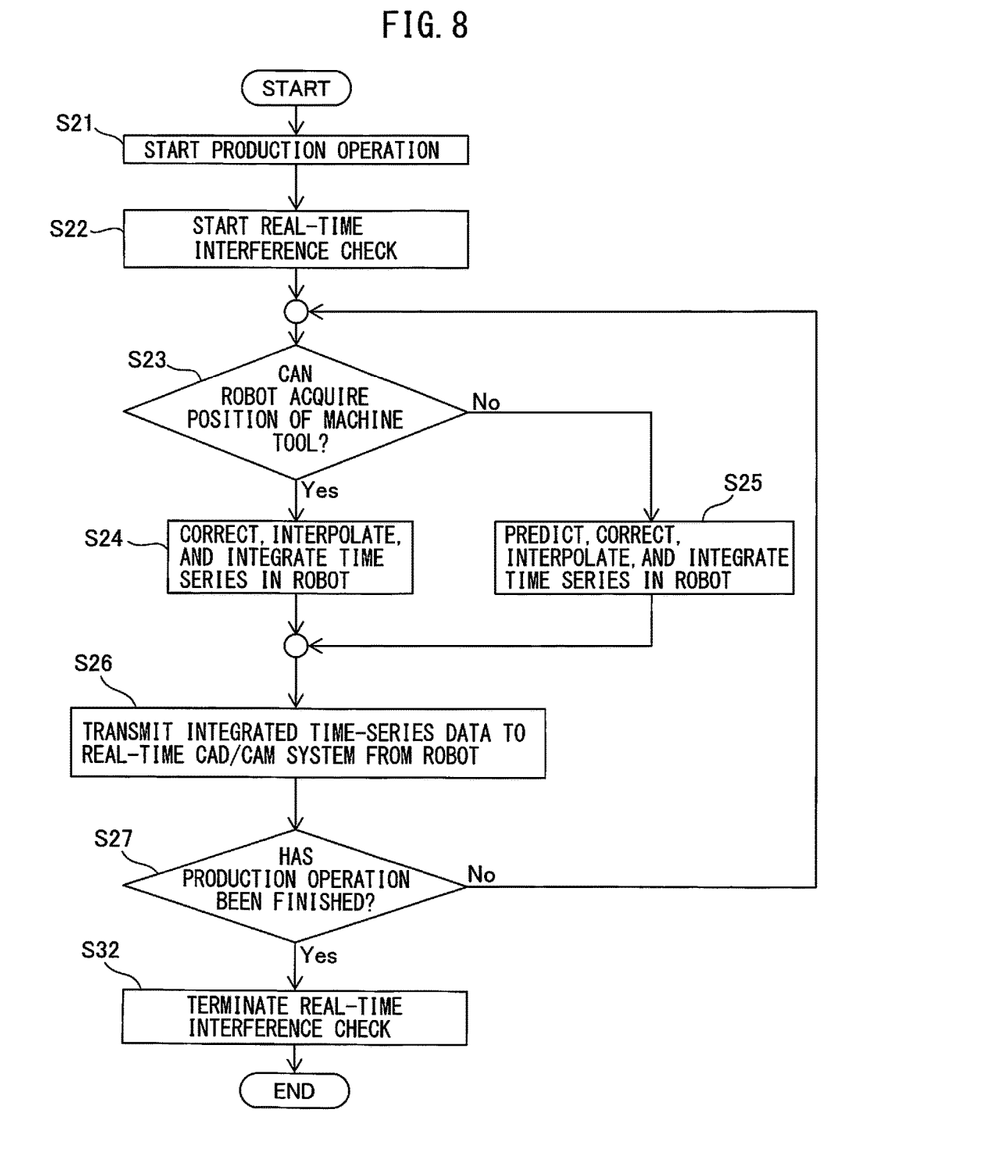
FIG. 8 is a flowchart mainly illustrating a flow of processing of a robot controller in the second embodiment.
Figure 9:
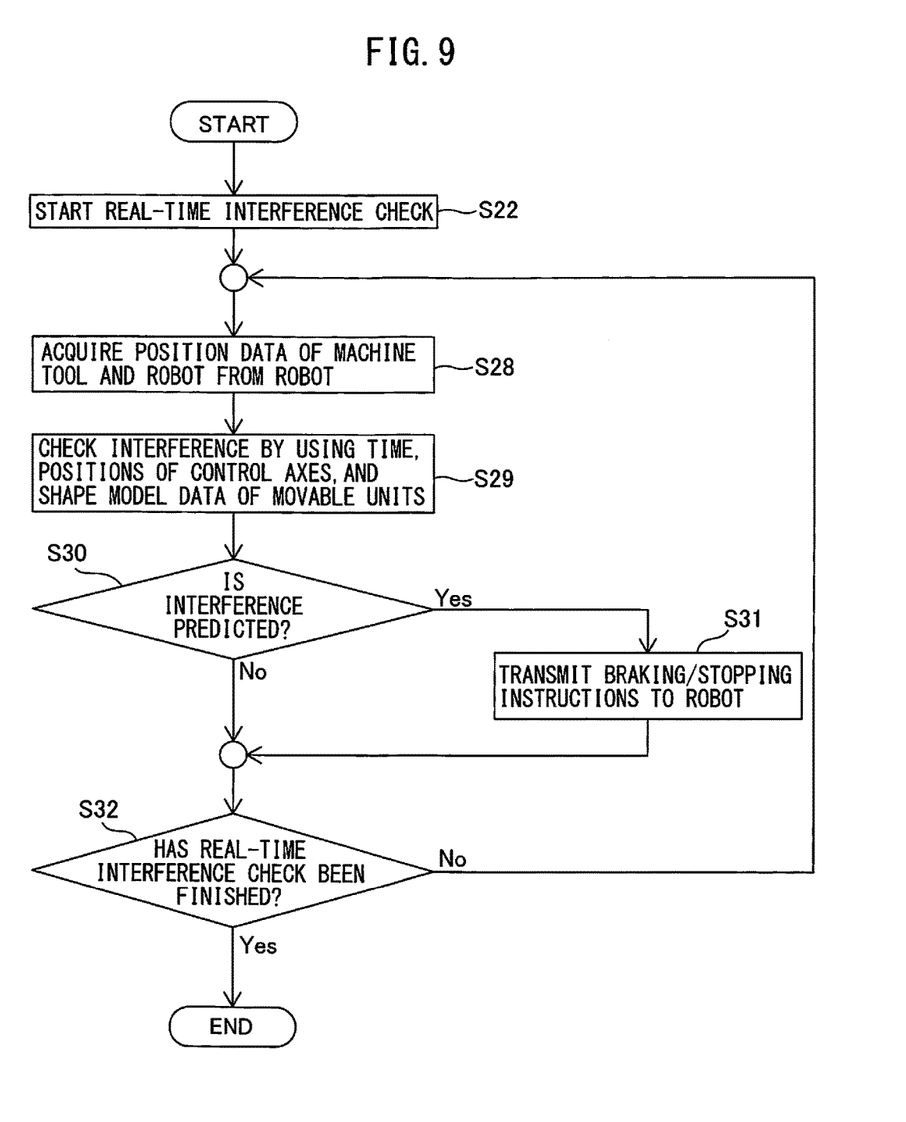
FIG. 9 is a flowchart mainly illustrating a flow of processing of an interference check execution unit in the second embodiment.

FIG. 8 and FIG. 9 resemble FIG. 2 and FIG. 3, respectively, and are each a flowchart explaining a flow of processing in the interference check system 10a. The flowchart in FIG. 8 mainly illustrates the processing in the robot controller 18 and the flowchart in FIG. 9 mainly illustrates the processing in the interference check execution unit 24.

First, when the production operation (collaborative work) by the machine tool 12 and the robot 16 is started (step S21 in FIG. 8), the interference check execution unit 24 performs real-time interference check processing of the mechanical unit 20 of the machine tool and the mechanical unit 22 of the robot (step S22). This processing may be the same as that of the first embodiment.

At the next step S23, whether or not the robot controller 18 can acquire, while having the real-time properties, a set (data set) of an operation time of the machine tool 12 (machine tool time) and positions of control axes of the machine tool 12 corresponding to the machine tool time, which set is generated sequentially by the machine tool controller 14, is determined. More specifically, whether or not the real-time properties of the data communication from the transmitter unit 40 of the machine tool controller 14 to the receiver unit 32 of the robot controller 18 are secured is determined. When the real-time properties of communication are secured, the position data correcting/interpolating unit 28 of the robot controller 18 integrates the data set from the machine tool controller 14 and a set (data set) of an operation time of the robot 16 (robot time) and positions of control axes of the robot 16 corresponding to the robot time, which set is generated sequentially by the robot controller 18. Specifically, the position data correcting/interpolating unit 28 performs interpolation with respect to time and newly obtains the position (time-series data) of the control axes of the machine tool 12 by performing correction calculation to obtain the position (time-series data) of the control axis of the robot 16 and the position of the control axis of the machine tool 12 corresponding to each robot time, and then couples both data sets (step S24).

On the other hand, in the case where the real-time properties of communication are not secured, the position data correcting/interpolating unit 28 needs to obtain the positions of the control axes of the machine tool 12 corresponding to each robot time in the state where the time and positions of the control axes of the machine tool 12 from the transmitter unit 40 of the machine tool 12 have not reached the receiver unit 32 of the robot 16 yet. Because of this, the position data correcting/interpolating unit 28 estimates (predicts) the positions of the control axes of the machine tool 12 corresponding to each robot time, by using the accumulated old positions (time-series data) of the control axes of the machine tool 12 (step S25). As this estimation processing, it is possible to apply the same methods as those of the first embodiment.

By the processing at step S24 or S25, the position of the machine tool after the interpolation and the position of the robot are integrated into one piece of the time-series data of position. This integrated (coupled) time-series data is transmitted from the robot controller 18 to the interference check execution unit 24 (e.g., real-time CAD/CAM system) (step S26). The processing at steps S23 to S26 is repeated until the production operation is finished (step S27). The correction processing at steps S23 to S27 is performed normally at intervals of 1 ms to 10 ms.

In relation to step S26 in FIG. 8, the interference check execution unit 24 receives the integrated (time-series) data of position of the machine tool 12 and the robot 16 from the robot controller 18 (step S28 in FIG. 9). Next, the interference check execution unit 24 checks presence/absence of interference between the mechanical unit 20 of the machine tool and the mechanical unit 22 of the robot (specifically, presence/absence of contact or overlap between the two shape models) based on the shape models of the mechanical unit 20 of the machine tool and the mechanical unit 22 of the robot stored and held in advance and the integrated time-series data (specifically, each time included in the time-series data (time when interference check) and the positions of the control axes of the machine tool and the robot corresponding to each time) (step S29). In the second embodiment, the time when interference is checked is the same as the operation time of the robot 16.

In the case where it is predicted that interference will occur based on the results of the processing at step S29, the braking/stopping instructions are transmitted to the robot controller 18 from the interference check execution unit 24 by message transmission (step S31). The real-time interference check at step S28 and subsequent steps is repeated until the production operation is completed (step S32, step S27 in FIG. 8). Normally, the interference check processing at steps S28 to S32 is periodically performed at intervals of 0.25 ms to 40 ms.

It may also be possible to perform the interference check processing only during the production operation or while power is being supplied to the machine tool 12 and the robot 16 even if the production operation is not being performed.

Alternatively, even if the production operation is not being performed, it may also be possible to perform the interference check in real time and to disable the operation of an operator when interference is predicted also when the operator of the machine tool manually operates the spindle axis of the machine tool and movable units, such as the machining table, in the case of operating the machine tool by programs, in the case of jogging the robot, etc.

In the second embodiment, even in the case where the interference check execution unit 24 is not provided on the machine tool 12 side, it is possible to give the real-time interference check function substantially equivalent to that of the first embodiment to the collaborative system including the machine tool and the robot by using a robot having the real-time interference check function for the robot.

Figure 10:
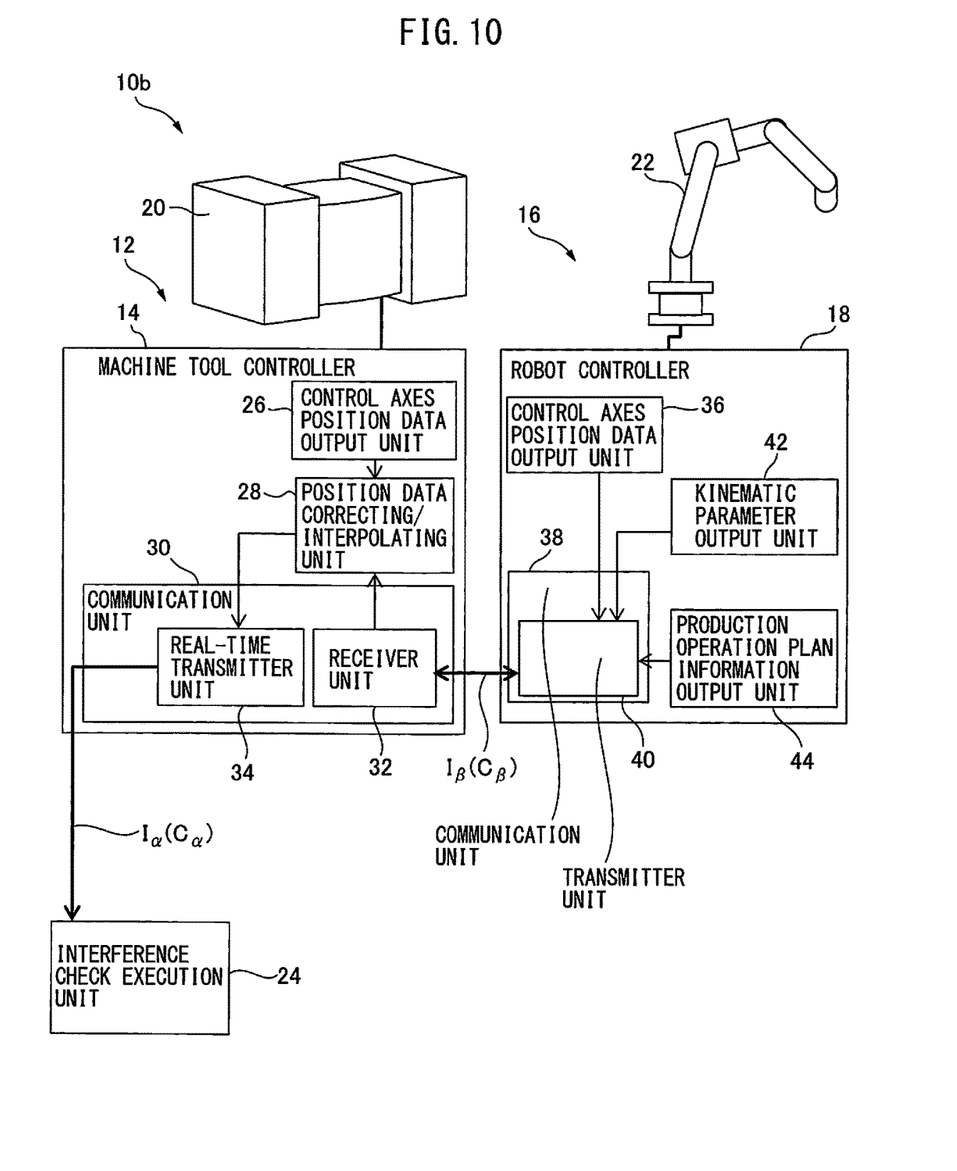
FIG. 10 is a diagram illustrating an outline configuration of an interference check system according to a third embodiment of the present invention.

FIG. 10 is a diagram illustrating an outline configuration of an interference check system 10b according to a third embodiment of the present invention. The interference check system 10b differs from the interference check system 10 according to the first embodiment in that the robot controller 18 has a kinematic parameter output unit 42 and a production operation plan information output unit 44 and the other components and the functions thereof may be the same as those of the first embodiment. Consequently, in FIG. 10, the same reference symbols are attached to the components equivalent to those of the first embodiment and detailed explanation thereof is omitted.

The kinematic parameter output unit 42 is configured to output kinematic parameters of the control axes of the robot 16 to the communication unit 38 and the production operation plan information output unit 44 is configured to output production operation plan information to the communication unit 38. Consequently, in the interference check system 10b, it is possible to send the kinematic parameters of the control axes of the robot 16 and information on the program being executed via the interface $I_\beta$ from the transmitter unit 40 of the robot controller 18 to the receiver unit 32 of the machine tool controller 14.

The interference check system 10b according to the third embodiment is particularly suitable to the case where the real-time properties of the data communication between the robot controller 18 and the machine tool controller 14 via the interface $I_\beta$ cannot be expected. Hereinafter, a flow of processing in the interference check system 10b is explained with reference to the flowchart in FIG. 11.

Figure 11:
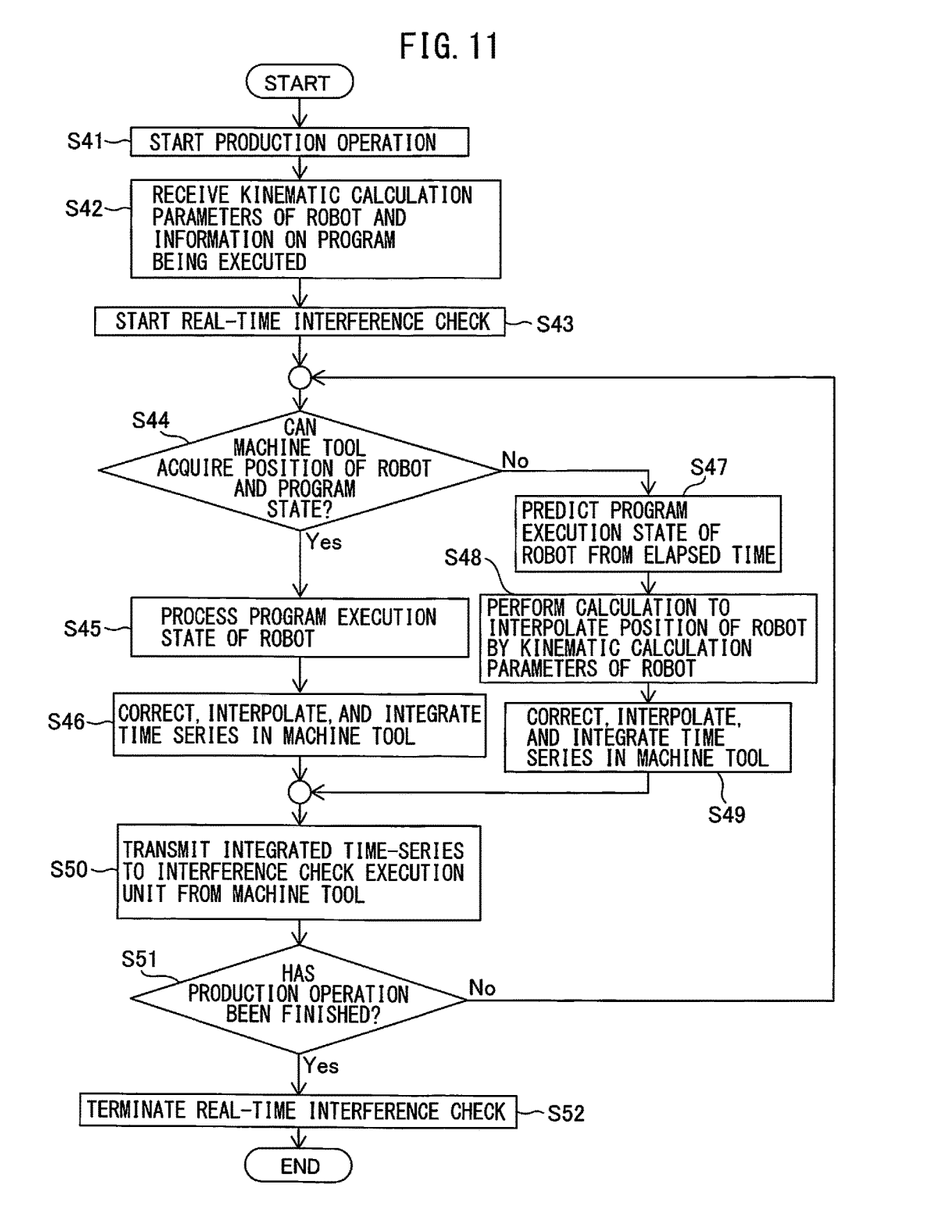
FIG. 11 is a flowchart illustrating a flow of processing in the third embodiment.

First, when the production operation (collaborative work) by the machine tool 12 and the robot 16 is started (step S41), the machine tool controller 14 receives the kinematic parameters of the control axes of the robot 16 and the information on the program being executed from the robot controller 18 (step S42). Next, the interference check execution unit 24 performs real-time interference check processing of the mechanical unit 20 of the machine tool and the mechanical unit 22 of the robot (step S43). This processing may be the same as that of the first embodiment.

At the next step S44, whether or not the machine tool controller 14 can acquire, while having the real-time properties, data (data set) of an operation time of the robot 16 (robot time) and positions of control axes of the robot 16 corresponding thereto and the state of (information on) the state of the program being executed from the robot controller 18 is determined. More specifically, the position data correcting/interpolating unit 28 determines whether or not the real-time properties of the data communication from the transmitter unit 40 of the robot controller 18 to the receiver unit 32 of the machine tool controller 14 are secured. When the real-time properties of communication are secured, the machine tool controller 14 acquires the time and the position (of the control axis) of the robot 16, and the execution state of the program (step S45), and the position data correcting/interpolating unit 28 of the machine tool controller 14 integrates the data set from the robot controller 18 and data (data set) of an operation time of the machine tool 12 (machine tool time) and a position of a control axis of the machine tool 12 corresponding thereto. Specifically, in order to obtain the position (time-series data) of the control axis of the machine tool 12 and the positions of the control axes of the robot 16 corresponding to each machine tool time, the position data correcting/interpolating unit 28 performs interpolation with respect to time and newly obtains the position (time-series data) of the control axis of the robot 16 by performing correction calculation so as to obtain the operation position of the robot that reflects the kinematic parameters based on the program execution state at each code in time, and then couples both the data sets (step S46).

However, in the third embodiment, it is supposed that the real-time properties in the interface $I_\beta$ are not secured (in most cases, the processing proceeds to "No" at S44). In this case, the program execution state of the robot 16 is predicted from the elapsed time (step S47). More specifically, at step S47, the current program codes execution state of the robot is estimated from the elapsed time from the time of the last acquisition of the program codes execution state from the robot, and further, based on the elapsed time and the contents of the program, details of the state of progress of the program execution are predicted.

Next, at step S48, the position (of the control axis) of the robot 16 is calculated by interpolation from the kinematic calculation parameters of the robot 16 (step S48). More specifically, when the robot is not moved by the program execution command of the robot, the position of the robot corresponding to the time of the last acquisition of the program execution state is adopted. On the other hand, in the case where it is determined that the robot is being moved by the program codes execution of the robot, the displacement of each axis of the robot is calculated with the kinematic parameters and the current position of the robot is calculated.

Next, at step S49, both of the data sets, i.e., the position (time-series data) of the control axes of the robot corresponding to each machine tool time and the position (time-series data) of the control axes of the machine tool are integrated (coupled) and thus one piece of time-series data is generated.

By the processing at step S46 or S49, the position of the machine tool after the interpolation and the position of the robot are integrated into one piece of time-series data of position. This integrated (coupled) time-series data is transmitted from the machine tool controller 14 to the interference check execution unit 24 (e.g., real-time CAD/CAM system) (step S50). Although not illustrated in FIG. 11, in the case where it is predicted that interference will occur, the braking/stopping instructions are sent by message transmission from the interference check execution unit 24 to the machine tool controller 14. The real-time interference check is repeated until the production operation is finished (steps S51, S52). The correction processing at steps S44 to S51 is normally performed at intervals of 1 ms to 10 ms.

In the third embodiment, even if there is a restriction that communication connection, for which real-time properties are secured, cannot be established between the machine tool and the robot, it is possible to check the real-time interference. Further, even in the case where real-time communication function is not included in the robot, or in the communication hardware, it is possible to check the real-time interference in the collaborative system as a whole.

Similar to the relationship between the first embodiment and the second embodiment, it is of course possible to design an embodiment, which is the third embodiment modified by taking the source of communication of the position data of the control axes to be the machine tool controller 14 and the destination of communication to be the robot controller 18.

As explained above, in the interference check system according to the present invention, the controller (CNC) of the machine tool and the controller of the robot are connected on-line and the position data of one of them is transmitted to the other, and the calculation processing to integrate the position data of the mechanical units of the machine tool and the robot, respectively, is performed. Consequently, even in the case where the transmission protocol and the interface of the position data between the controllers are different from the transmission protocol and the interface for transmitting/receiving of the position data between the controller and the interference check execution unit, it is possible to appropriately check an interference in real time. Further, even in the case where it is possible for the controller on the transmission side to transmit accurate position data, but not possible to secure the real-time properties of communication, it is possible for the controller that integrates data sets to appropriately predict the position data and to integrate the position data of the mechanical units of the machine tool and the robot, respectively.

Because the position data of the machine tool and the robot is integrated, it is possible to check interference in real time between the machine tool and the robot without the need to make any change to the real-time interference check CAD/CAM system, such as additionally providing a physical connection interface for real-time communication and adding communication equipment from the real-time interference check CAD/CAM system to the controller on the transmission side.

Even if the real-time properties of the communication between the robot and the machine tool cannot be secured, by interpolating position data necessary for the real-time interference check, it is possible to perform the real-time interference check in the whole of the one real-time interference check CAD/CAM system. Further, due to the real-time interference check CAD/CAM system for a single machine tool or the real-time interference check function for a robot, it is possible to check interference in the entire system including the machine tool and the robot, and therefore, it is possible to improve safety of the work at the time of activation of the system, and as a result of this, it is possible to reduce the period of time required to complete the system.

Furthermore, in the case where a robot is introduced afterward to reduce the burden of the work of an operator in a production cell that is configured by a machine tool and a real-time interference check CAD/CAM system and which is designed on the premise that the production cell is operated by an operator, it is possible to reduce the robot introduction cost. Even in the case where no real-time interference check system is provided in a machine tool, by configuring the system by a robot controller having the real-time interference check function, it is possible to give the real-time interference check function of the mechanical unit inside the machine tool to the robot.

According to the present invention, the position data of the control axes of a machine tool and a robot, respectively, is integrated into time-series data, and therefore, it is possible to check interference in real time between a machine tool and a robot without the need to change the facility, such as additionally providing a physical connection interface for real-time communication at the time of checking interference in real time.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An interference check system,. comprising:
a machine tool controller configured to control a machine tool; and
a robot controller configured to control a robot, wherein
the machine tool controller includes shape model data of a mechanical unit of the machine tool and a mechanical unit of the robot and is configured to check interference between the mechanical unit of the machine tool and the mechanical unit of the robot,
the machine tool controller or the robot controller is configured to
integrate, during the operation of the robot and the machine tool, (i) a first set of an operation time of the robot and positions of control axes of the robot corresponding to the operation time of the robot, which first set is generated by the robot controller, and (ii) a second set of an operation time of the machine tool and positions of control axes of the machine tool corresponding to the operation time of the machine tool, which second set is generated sequentially by the machine tool controller, and
sequentially generate a third set of a time when interference is checked and positions of control axes of the robot and the machine tool corresponding to the time when interference is checked, and
the machine tool controller is configured to check interference in real time between the mechanical unit of the machine tool and the mechanical unit of the robot based on
the shape model data of the mechanical units of the machine tool and the robot, and
the third set of the time when interference is checked and the positions of the control axes of the robot and the machine tool corresponding to the time when interference is checked, which third set is generated sequentially.

2. The interference check system as set forth in claim 1, wherein the time when interference is checked is the same as the operation time of the machine tool.

3. The interference check system as set forth in claim 1, wherein the time when interference is checked is the same as the operation time of the robot.

4. An interference check system, comprising:
a machine tool controller configured to control a machine tool; and
a robot controller configured to control a robot, wherein
the robot controller includes shape model data of a mechanical unit of the machine tool and a mechanical unit of the robot and is configured to check interference between the mechanical unit of the machine tool and the mechanical unit of the robot,
the machine tool controller or the robot controller is configured to
integrate, during the operation of the robot and the machine tool, (i) a first set of an operation time of the robot and positions of control axes of the robot corresponding to the operation time of the robot, which first set is generated by the robot controller, and (ii) a second set of an operation time of the machine tool and positions of control axes of the machine tool corresponding to the operation time of the machine tool, which second set is generated sequentially by the machine tool controller, and sequentially generate a third set of a time when interference is checked and positions of control axes of the robot and the machine tool corresponding to the time when interference is checked, and the robot controller is configured to check interference in real time between the mechanical unit of the machine tool and the mechanical unit of the robot based on the shape model data of the mechanical units of the machine tool and the robot, and the third set of the time when interference is checked and the positions of the control axes of the robot and the machine tool corresponding to the time when interference is checked, which third set is generated sequentially.

* * * * *